Figure 1:
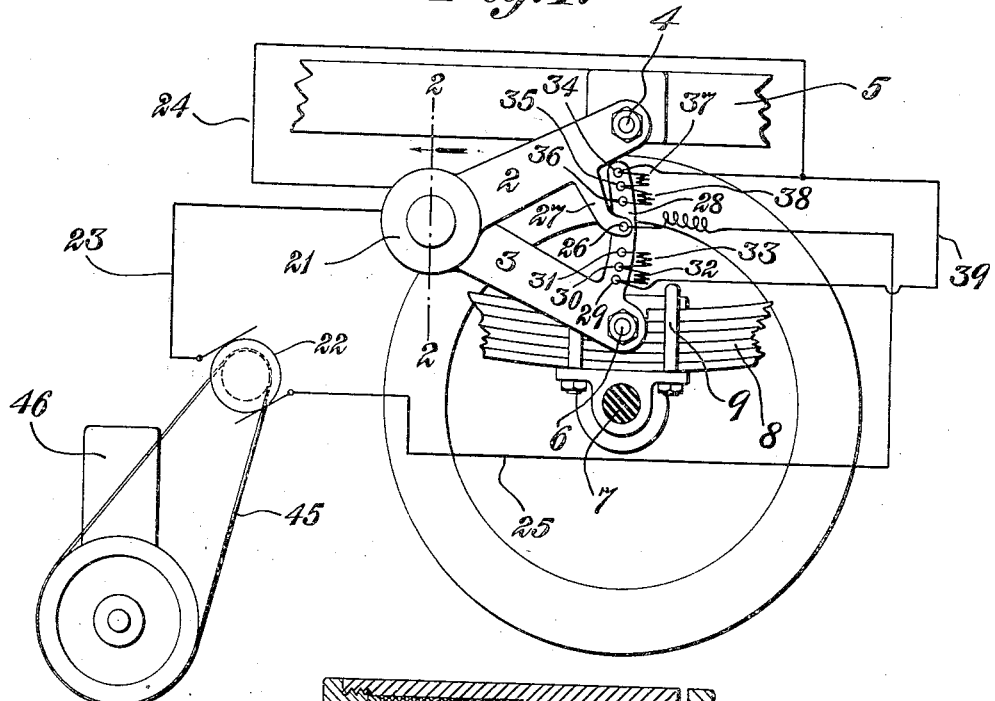

W. T. SEARS.
SHOCK ABSORBER.
APPLICATION FILED OCT. 15, 1913.

1,123,404.

Patented Jan. 5, 1915.
2 SHEETS—SHEET 1.

Witnesses:
L. L. Markel
James H. Keane

Inventor:
W. T. Sears
By his Attorneys,
Sutherland & Anderson

W. T. SEARS.
SHOCK ABSORBER.
APPLICATION FILED OCT. 15, 1913.

1,123,404.

Patented Jan. 5, 1915.
2 SHEETS—SHEET 2.

Witnesses:
L. L. Markel
James H. Keane

Inventor:
W. T. Sears
By his Attorneys
Sutherland & Anderson

UNITED STATES PATENT OFFICE.

WILLARD T. SEARS, OF PHILADELPHIA, PENNSYLVANIA.

SHOCK-ABSORBER.

1,123,404.  Specification of Letters Patent.  Patented Jan. 5, 1915.

Application filed October 15, 1913. Serial No. 795,225.

*To all whom it may concern:*

Be it known that I, WILLARD T. SEARS, a citizen of the United States, residing at Philadelphia, in the county of Philadelphia and State of Pennsylvania, have invented certain new and useful Improvements in Shock-Absorbers, of which the following is a specification.

This invention relates to what are known as "shock-absorbers," one of the principal purposes of the invention being the provision of an appliance of this type which is effective in action and by which variable resistance can be secured in a positive and certain manner. A shock-absorber involving the invention can be employed with utility in divers connections; for instance it can be incorporated in a vehicle such as an automobile, and in this event it is adapted to preclude undue or abnormal vibration of one of the members of the vehicle, such as the body.

In the drawings accompanying and forming part of the present specification I have shown in detail several of the many different forms of embodiment of the invention which to enable those skilled in the art to practice the same will be set forth fully in the following description. I do not restrict myself to this disclosure; I may depart therefrom in material respects within the scope of the invention defined by the claims following said description.

Figure 2:
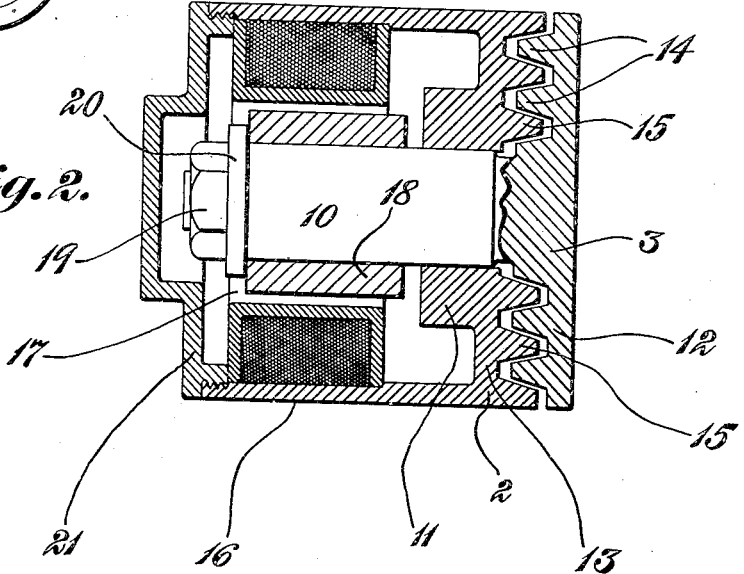
Figure 3:
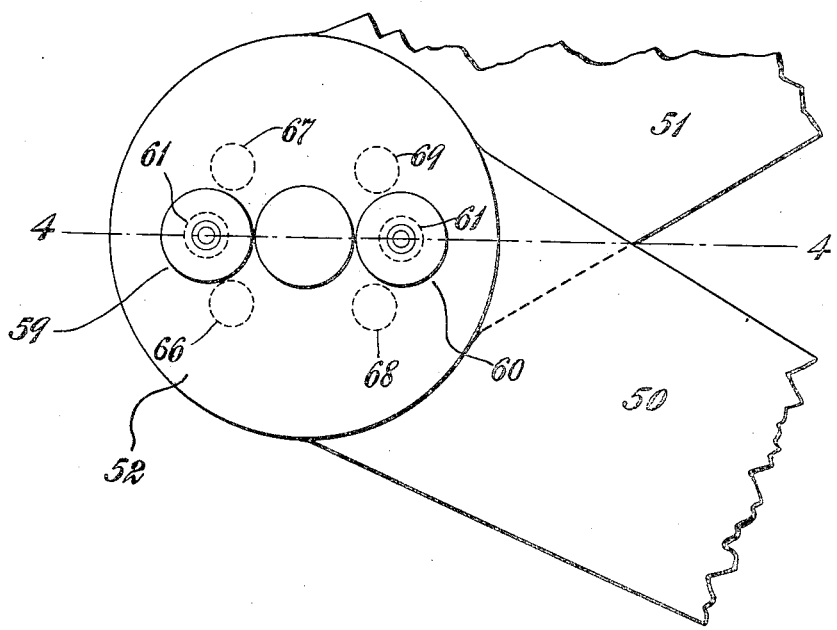
Figure 4:
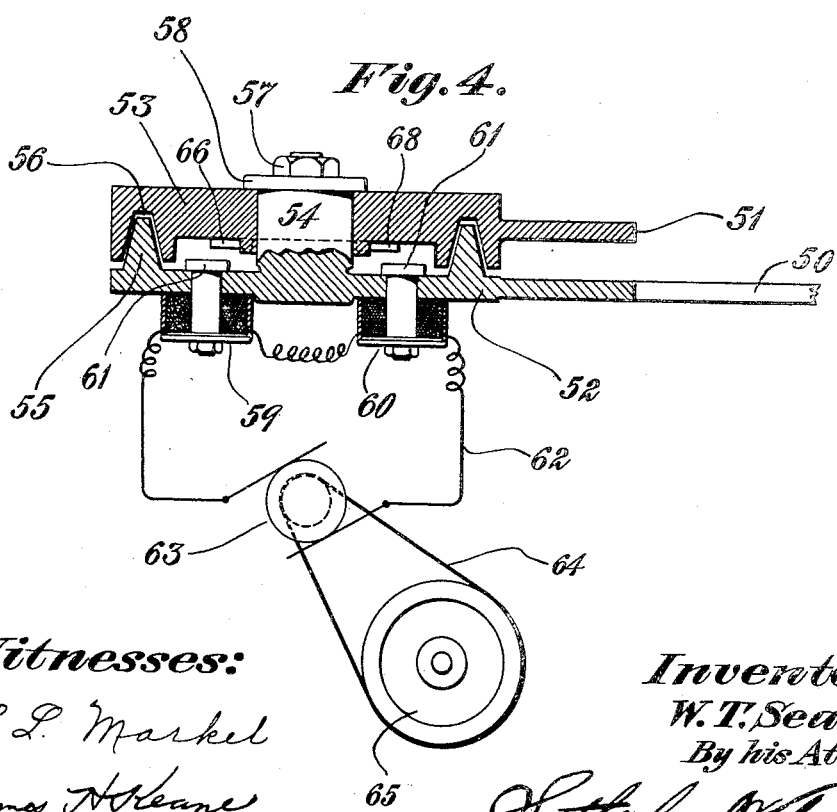

Referring to said drawings: Figure 1 is a diagrammatic side elevation of a shock-absorber involving my invention and showing the same mounted in place between the running-gear and the body of a vehicle partly illustrated. Fig. 2 is a vertical section on the line 2—2 of Fig. 1, looking in the direction of the arrow and on an enlarged scale. Fig. 3 is a fragmentary side elevation of another form, and, Fig. 4 is a section on the line 4—4 of Fig. 3.

Like characters refer to like parts in the several figures.

My invention comprises as to one of its broader features a shock absorber provided with motion-resisting means and with electrical means for varying the amount or intensity of the resistance. The shock absorber, the resisting means and the electrical means all may vary decidedly in nature.

The motion resisting means is adapted as its term implies, to resist motion of a movable member, and where the shock-absorber comprises two relatively movable members as is the case with that shown in the drawings, the motion-resisting means resists such relative motion. I again wish to make it clear that the motion-resisting means may be of any convenient kind, although one which is mechanical in type meets the necessary condition, and I might observe that I have found a friction device as satisfactory in this particular respect. In like fashion the electrical means may vary, but of whatever form the same takes, it as a matter of practice acts in conjunction with the motion resistant. I prefer, however, to employ in combination with the resisting means a magnet and when I do use the same it may be any one of several kinds; for example a solenoid, an electro-magnet or a permanent magnet.

In Fig. 1 of the drawings I have shown a shock-absorber of familiar type with which my improvements can advantageously coöperate. As will be concluded from what has already been said the improvements can be associated with radically different forms of shock-absorbers. The shock-absorber is of the well-known scissors type and comprises the two elements 2 and 3, and when used in connection with a vehicle such as an automobile, one of the elements (as that numbered 2) has the upper end pivoted or otherwise connected as at 4 to the body of the vehicle partially shown and denoted by 5, while the other (3) can be similarly united as at 6 to the running gear of the vehicle, the axle 7, the spring 8, and the spring clip 9 of which appear. The invention therefore, as will be understood, does not reside in any particular type of vehicle nor any special form of shock-absorber. The lower link or element 3 of the shock absorber is provided with a lateral stud or pin 10 constituting a suitable pivot, which as will be understood is situated at the upper end of said link 3 or the terminal opposite that to which the pivot 6 is connected. The lower terminal portion of the upper link has a hub or bearing 11 to receive the pivot 10 which provides a simple way of connecting the two links for relative motion. The pin 10 extends centrally from the disk-like head 12 of the lower link, the upper link 2 being equipped with a substantially similar head 13 furnished with the hub or bearing 11 to which I have already referred.

The two heads or disks 12 and 13 present together a resisting device, the head being shown with annular beads or ribs 14, while the head or disk 13 is furnished with duplicate annular ribs or beads 15, the several beads being of frusto-V-form in cross section and one set of beads being adapted to enter into the spaces between the other set as shown in Fig. 2. By moving the beads 14 into the spaces between the beads 15 in such manner that the walls of the two are brought into contact the relative oscillation of the parts 12 and 13 will be resisted and the greater the pressure of contact, the greater will be the resistance to such relative oscillation, so that the two heads 12 and 13 present a convenient form of variable frictional checking-device. As will hereinafter appear the relative motion of the members 12 and 13 toward and from each other is governed electrically. The head or disk 13 is shown provided with an outwardly extending casing or housing 16 which receives the solenoid 17 the cylindrical or sleeve-like core 18 of which is rigidly fitted to the pivot 10 to constitute in effect a part of said pivot, said pivot 10 having the nut 19 fitting against the washer 20 which in turn fits against the solenoid core 18 to prevent accidental displacement of said core. To prevent dust and other foreign matter getting into the casing or housing 6 the latter may be furnished with a removable screw cap 21. It will be clear that when the solenoid 17 is energized it attracts its core 18 thereby applying through the washer 20 acting as a shoulder or collar on the pivot 10, a pull to the pivot 10 in such direction as to draw the annular beads 14 into the spaces between the annular beads 15. If the current applied to the solenoid 17 be not great, the frictional checking effect of the members 12 and 13 will be correspondingly low. If the strength of the current be increased, the frictional checking effect will be correspondingly increased and the strength of the current may be varied from a comparatively small point to one of considerable intensity, although the variation is preferably gradual in order to secure the best effects or avoid unpleasant results. This variation in strength of current can be obtained in any desirable manner, although it is preferably secured automatically for example by the use of electrical resistance.

The means from which the electro-motive force is derived may be of any suitable character, the generator (as a dynamo) 22 shown conventionally in Fig. 1 being provided. From one brush of the generator the conductor 23 leads being connected with one terminal of the solenoid 17, while the conductor 24 extends from the opposite terminal of said solenoid. From the opposite brush of the generator 22, the conductor 25 extends and is connected electrically with the terminal 26 supported by but insulated from the projection 27 on the link 2, which projection 27 is adapted to traverse a longer projection 28 on the link 3 as the links 2 and 3 relatively open and close. On the lower portion of the arm 28 are the contacts 29, 30 and 31 insulated from said arm. The contact 29 is connected with the intermediate contact 30 by the resistance 32, while the intermediate contact 30 is connected with the upper contact 31 by the resistance 33. The upper portion of the arm 28 is provided with the contacts 34, 35 and 36, all insulated from said arm, the upper contact 34 being connected with the intermediate contact 35 by the resistance 37, while the resistance 38 contacts the intermediate contact 35 with the lower contact 36, it being understood that the two series of contacts are on an arc struck from the axis of the pivot 10, and that the contact 26 also follows this same arc. The contacts 29 and 34 are bridged by the conductor 39 to which the conductor 24 is electrically connected. When the vehicle or other part with which the absorber is connected is in a quiescent condition the shock absorber occupies a neutral position at which time the contact or switch member 26 is substantially midway between the contacts 31 and 36. Should the links 2 and 3 be closed up to the point where resistance is required, the contact 26 will ride upon the contact 31 thereby closing the circuit of the solenoid 17 and energizing the latter, the maximum amount of resistance being in the closed circuit at this time so that the strength of current applied to the solenoid is at the minimum. Should the two links as 3 be closed further or until such time as the contact member 26 engages the contact member 30, the resistance 33 will be cut out of the circuit, but the resistance 32 will be still therein, the current supplied to the magnet being therefore correspondingly stronger. Should the links be further closed or until the contact member 26 engages the contact member 29, all resistance will be cut out of the circuit, so that the maximum strength of current is supplied to the solenoid, by reason of which the latter exerts its maximum pull on the core 18 to secure the extreme frictional engaging effect between the parts 13 and 14 and consequently the greatest checking effect. The same results follow when the links are opened.

I have described in detail one way by which variability of resistance can be obtained electrically, and this regardless of the speed of the vehicle. It will be evident that I can utilize the shock absorber in any connection where such a device is appropriate, but when used on a vehicle I provide means whereby the resistance can be varied through electrical means in accordance with the speed of the vehicle. For example I may connect the dynamo or generator 22 by a belt 45 with the engine 46 or equivalent motor by which the car is driven and the velocity of the dynamo will vary with the speed of the car, so that naturally the current generated is correspondingly varied. Both of these ways of getting the variation in current can be employed together or either of them can be used independently of the other, both being effective. It will be clear therefore, that my invention comprises two elemental features, one an electrical control of a resistant, which latter term I use in distinction to the electrical resistance in connection with the circuit already described, and another magnetic means for operating the resistant. As I have already observed the magnet, when employed, may be any one of several characters, a solenoid having been already set forth. I might employ a permanent magnet for this purpose with equally satisfactory results, but I have shown in Figs. 3 and 4 and will now describe an electromagnet construction which is satisfactory. In these two views the numerals 50 and 51 represent the members of a scissors shock-absorber provided with heads 52 and 53 pivotally connected together by a stud 54 extending from the head 52, the latter being provided with the annular projection or head 55 of wedge form in cross section, adapted to enter the correspondingly shaped annular channel 56 in the coöperating head 53. When the walls of the wedge part 55 and channel 56 engage each other there is a frictional resistance to the relative oscillation of the two members 50 and 51, and this is varied in accordance with the amount of engagement between the two parts as already more fully described in connection with the other form of the device; in fact the only difference between the two forms of shock absorber if it can be considered a difference, is in the multiplication of the circular ribs and channels. The pivot stud 54 is equipped with a nut and washer denoted by 57 and 58 respectively to hold the parts 50 and 51 in assembled relation. Upon the outer side of the head 52 are mounted the electromagnets 59 and 60. The cores of said magnets extend through said head 52, their enlarged inner ends 61 being disposed in the space between said heads. The entire part 51 might be of some non-magnetizable material, such as brass or phosphor-bronze or the head 53 only could be made of this material, by reason of which said head 53 will not itself be attracted when the magnets 59 and 60 are energized. These magnets are disposed approximately diametrically opposite each other. While two of them are illustrated their number could be increased; in fact it is conceivable that one only could be employed. The magnets are both in the closed circuit 62 including the dynamo 63 connected as by a belt 64 to the fly wheel 65, so that when the shock-absorber is mounted on a vehicle the dynamo 63 will be driven at a speed proportional with the speed of the vehicle. Each of the magnets (59 and 60) is shown as having two armatures, the armatures being carried by the head 53. The armatures for the magnet 59 are denoted by 66 and 67 respectively while those for the magnet 60 are designated by 68 and 69 respectively. When the shock-absorber is in a neutral position as shown in Fig. 3 the cores of the respective magnets will be located approximately midway of their respective armatures. It will be assumed that the elements 50 and 51 are being closed. In this event the armature 69 will be moved toward the axis of the core of the magnet 60, while the armature 66 is moved toward the axis of the core of the magnet 59 and the closer the two armatures approach said axis or the magnetic fields, the greater will be the pull of said two magnets upon the armatures 69 and 66 respectively, while should the members 50 and 51 separate or open, the same action follows with respect to the armatures 67 and 68 to progressively increase the pull of the magnets upon said armatures 67 and 68 and thereby progressively increase the resisting effect. As the members 50 and 51 resume their normal positions the resisting effect is proportionately gradually reduced. In both forms of the device I can automatically magnetically vary the frictional or other checking effect applied to relatively movable members. I can also get the same results by variation in speed of a dynamo already described.

In closing I wish to make it clear that the invention does not reside in any particular details of construction but in certain broad relations, as will be set forth in my claims.

What I claim is:

1. A shock-absorber provided with motion-resisting means and with electrical means for varying the intensity of said motion-resisting means.

2. A shock-absorber provided with motion-resisting means and with electrical means governed by the shock-absorber, for varying the intensity of said motion-resisting means.

3. A shock-absorber provided with frictional motion resisting means, and electrical means for varying the amount of frictional resistance, 4. A shock-absorber movable oppositely from a neutral position, provided with motion-resisting means and with electrical means governed by the shock absorber for varying the intensity of said motion-resisting means when the shock-absorber is at both sides of its neutral position.

5. A shock-absorber provided with two relatively movable elements, a device for resisting the relative movement of said members, and electrical means for varying the resisting effect of said device.

6. A shock-absorber provided with motion-resisting means, an electrically-operable device for actuating the motion-resisting means, an electric circuit including said electrically-operable device, and means for cutting electrical resistances into and out of the circuit.

7. A shock-absorber provided with motion resisting means, an electrically-operable device for actuating the motion resisting means, an electric circuit including said electrically-operable device, and means operable by said relatively movable elements, for automatically cutting electrical resistance into and out of the circuit, on the relative motion of said relatively movable elements.

8. A shock absorber provided with two relatively movable elements having parts which coact to frictionally resist the relative movement of said elements, an electrically operative device having an element connected with one of said members, and means for energizing said electrically-operated device to cause said member to be drawn into frictional engagement.

9. A shock absorber provided with two pivotally-connected links equipped with parts which coöperate to constitute a frictional resisting device, a solenoid supported at the point of connection of said relatively movable elements, and a core for said solenoid connected with one of said members.

10. A shock absorber provided with motion resisting means and with a magnet for operating said motion-resisting means.

11. A shock absorber provided with frictional resisting means, and a magnet for operating said frictional resisting means.

12. A shock absorber provided with motion resisting means, a magnet for operating said motion-resisting means, and means for energizing the magnet and for varying the strength of current applied thereto.

13. A shock absorber provided with motion-resisting means and with a magnet for operating said motion-resisting means, and means for energizing the magnet and for automatically varying the strength of current supplied to said magnet.

14. A vehicle combined with a shock absorber thereon, said shock absorber being provided with motion-resisting means, and electrical means for varying the intensity of the motion-resisting means in correspondence with the speed of the vehicle.

15. A shock absorber comprising a plurality of relatively movable elements, a magnetically controlled device for resisting the relative movement, and means controlled by the movement of the part to which the shock absorber is connected, for automatically varying the resisting power.

16. A shock absorber provided with motion resisting means, and with magnetic means for operating the resisting means, and means for automatically varying the strength of the magnetic means in different positions of the shock absorber.

17. A shock absorber provided with motion resisting means, and with magnetic means for operating said motion resisting means, and automatic means for increasing the strength of the magnetic means progressively as the shock absorber moves from its neutral to a shifted position and in progressively decreasing the strength of the magnetic means in approximately equal proportion as the shock absorber returns to said neutral position from said shifted position.

In testimony whereof I affix my signature in presence of two witnesses.

WILLARD T. SEARS.

Witnesses:
DAVID T. NEVIN,
FRANK L. HELLINGS.